Patented Aug. 30, 1932

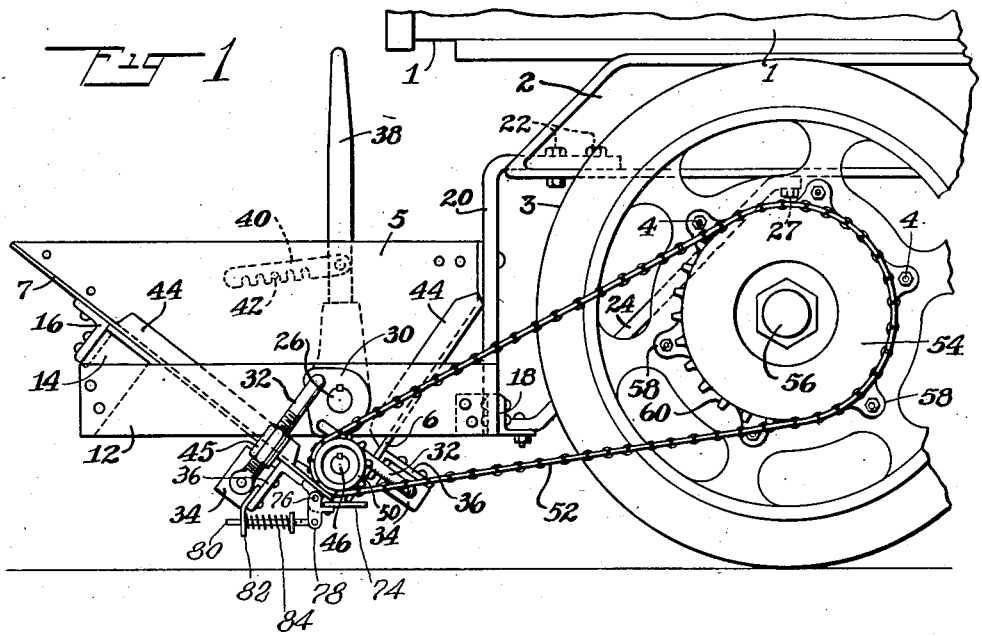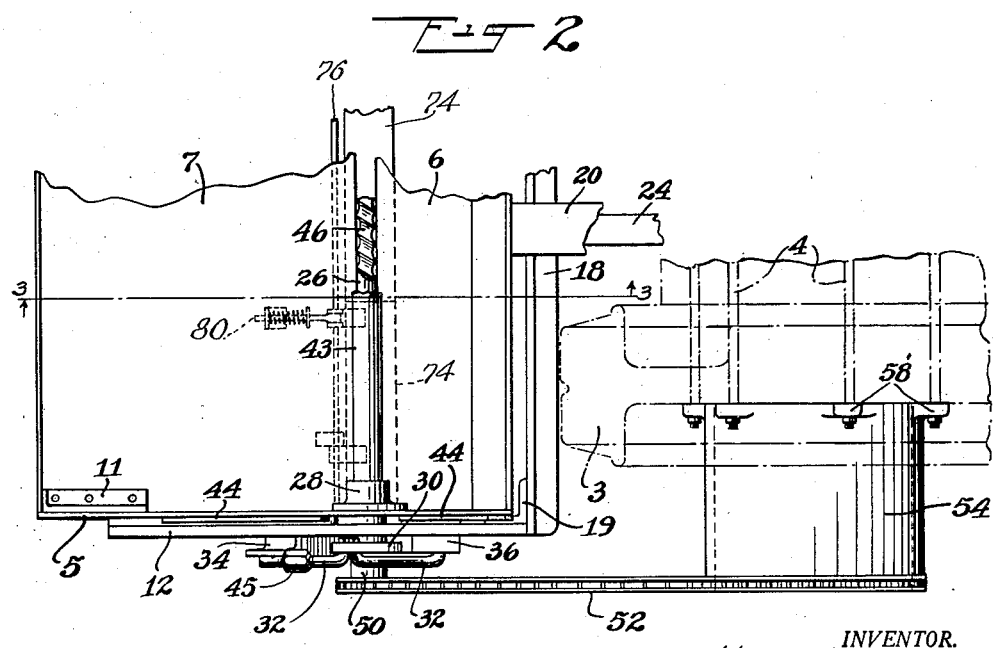

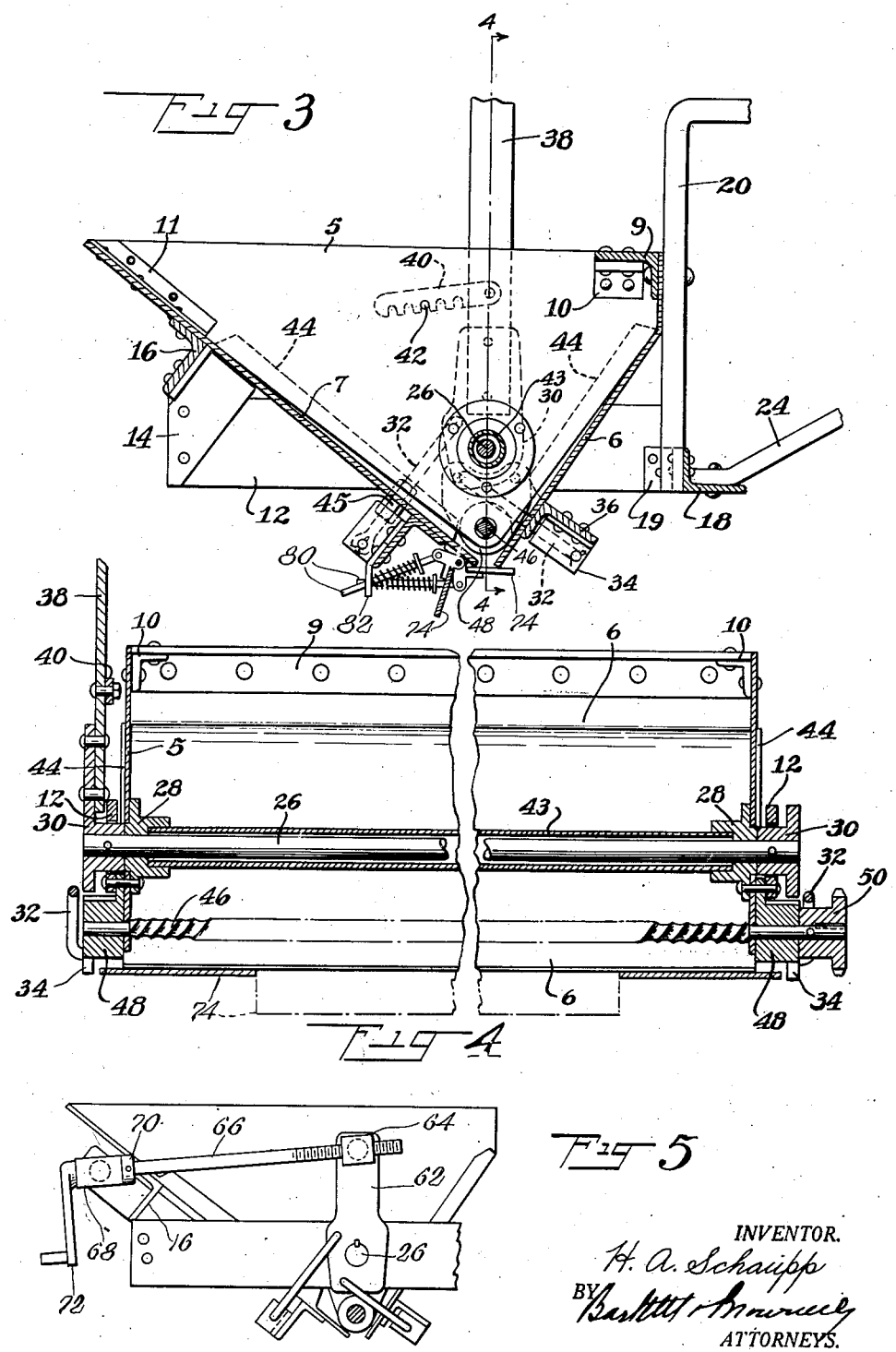

1,874,634

UNITED STATES PATENT OFFICE

HARRY A. SCHAUPP, OF FRANKFORT, NEW YORK, ASSIGNOR TO ACME ROAD MACHINERY COMPANY, OF FRANKFORT, NEW YORK, A CORPORATION OF NEW YORK

STONE SPREADER

Application filed March 20, 1928. Serial No. 263,116.

My invention relates to apparatus for spreading crushed stone, gravel, sand and other material in an evenly distributed layer upon the road surface, and has special reference to an apparatus of this character which is adapted to be attached to the rear of a self-propelled dump truck or other vehicle.

One of the objects of my invention is to provide a novel and improved apparatus of this character.

Another object of the invention is to provide an apparatus of this character which is simple in construction and efficient in operation, and which is adapted to be easily adjusted to vary the thickness of the layer of material spread thereby.

Another object of the invention is to provide a spreader of the character indicated in which there is provision of means for varying the width of the layer of material.

Another object of the invention is to provide an agitating device, for an apparatus of this character, of novel and improved construction.

A still further object of my invention is to provide a novel and improved power take-off device for driving a stone spreader or other apparatus from one of the rear wheels of a self-propelled vehicle.

Other objects of the invention and features whereby they may be attained, will be clearly understood from the following description and accompanying drawings, in which:

Figure 1 is a side view of the rear portion of a self-propelled dump truck with a stone spreader embodying the features of the invention in their preferred form attached thereto;

Fig. 2 is a plan view of a portion of the stone spreader illustrated in Fig. 1 with one of the rear wheels of the dump truck indicated by broken lines;

Fig. 3 is a transverse sectional view, on an enlarged scale, taken on the line 3—3 of Fig. 2.

Fig. 4 is a sectional view, partly broken away, taken on the line 4—4 of Fig. 3; and Fig. 5 is an end elevation of a stone spreader having a modified form of actuating means for varying the width of the discharge opening.

The self-propelled dump truck illustrated in the drawings, to which my improved spreader is shown attached, is provided with the usual body 1, frame 2, rear wheel 3, and bolts 4 for securing the brake drum to the wheel, the ends of the bolts projecting outwardly from the rear wheel and having nuts on their outer ends.

My improved spreader as illustrated in the drawings comprises a box or hopper having end walls 5, and front and rear side walls 6 and 7 which are inclined downwardly and inwardly with their lower edges spaced apart to provide a discharge opening between them. The upper portion of the front wall 6 is secured to the end walls by means of an angle iron 9 which extends longitudinally thereof and is secured thereto and has its ends secured on corner pieces 10 secured to the end walls. The upper portion of the rear wall 7 is secured to the end walls by angle irons 11. A cross-bar 12 extends across each of the end walls and has its rear end secured to an angle iron 14 which in turn is secured to one end of an angle iron 16 that extends the length of the rear wall and is secured thereto. The forward ends of the bars 12 are secured together by an angle iron 18, the ends of the bars 12 and angle iron 18 being connected by corner pieces 19.

The stone spreader is adapted to be attached to the dump truck by means of brackets 20 which are riveted to the front wall 6 and the angle iron 9, and the lower ends of the brackets are riveted to the angle iron 18, the brackets being secured to a convenient portion of the frame 2 of the dump truck by means of bolts 22. To further support the stone spreader a brace 24 may be secured at one end to the angle iron 18 and at its other end by a bolt 27 to the truck frame.

In the construction illustrated in the drawings the front and rear walls 6 and 7 are made of flexible material, such as sheet metal, and means is provided under the control of the operator for flexing the lower portions of said walls to move their lower edges toward and from each other to vary the width of the discharge opening. This means comprises a shaft 26 which is mounted at its ends in bearing blocks 28 suitably secured in apertures in the end walls 5. A disk 30 is secured on each end of the shaft 26 and is connected by links 32 with angle irons 34, respectively, that are secured on the ends of angle irons 36 which extends the length of the front and rear walls and are secured thereto in proximity to their lower edges. Each pair of links 32 are so connected with the associated disk 30 with relation to the axis of the shaft 26, that upon turning the shaft in one direction the two pairs of links will spread the lower portions of the front and rear walls of the hopper to increase the width of the discharge opening, and upon turning the shaft in the opposite direction the links will move the lower portions of the front and rear walls toward each other to decrease the width of the discharge opening.

The rock shaft 26 is adapted to be moved to vary the width of the discharge opening, by means of a hand operated lever 38 (Figs. 1 to 4) which is secured to one of the disks 30, the lever being held in adjusted position by means of a rack 40 pivotally mounted thereon and a pin 42 secured to the associated end wall of the hopper. The shaft 26 is enclosed by a pipe 43 having its ends rigidly secured in the bearing blocks 28. This pipe prevents the working of fine material into the bearings for the shaft, and also serves to tie the end walls of the hopper together against the pressure of the weight of the material in the hopper.

In order to prevent fine material from discharging along the corners of the hopper, the ends of the front and back walls are provided with upturned lips 44, each of which extends from near the lower end of the wall to a point in proximity to the rigid portion of the wall, the upper portion of the front wall 6 being held rigid by means of the angle iron 9 and corner pieces 10, and the upper portion of the rear wall 7 being held rigid by the angle iron 16 and corner pieces 11. To provide a fine adjustment of the discharge opening, and to compensate for any irregularity of construction, each of the links 32 connected with the rear wall 7 of the hopper is made in two sections that are connected by a turnbuckle 45.

A distributing or agitating shaft 46 of relatively small diameter is arranged directly above the discharge opening of the hopper with its ends extending through bearing blocks 48 secured to the outer end walls of the hopper. A sprocket wheel 50 is secured on one end of the shaft 46 and the shaft is driven from one of the rear wheels of the vehicle by means of a sprocket chain 52 which passes over said sprocket wheel. The shaft 46 is formed from a rod which is substantially square in cross section and is twisted so as to form approximately four twists to the foot. It has been found that such a distributing or agitating shaft is of cheap and strong construction, and the uniform spiral projections formed by twisting it insures an even discharge of the material from the hopper.

I have provided novel and improved power take-off means for driving the sprocket chain 52 from the rear wheel of the vehicle. This means comprises a cylindrical drum 54 which is passed over the hub cap 56 of the rear wheel, and is secured in place by outwardly projecting ears 58 on its inner end that are passed over the projecting ends of the brake drum securing bolts 4 when the nuts on the bolts are removed, the nuts being replaced so as to clamp the ears against the wheel. The outer end of the drum 54 is provided with sprocket teeth 60 for engagement with the sprocket chain 52.

It will be apparent that the stone spreader as above described is simple in construction and efficient in operation, and is adapted to be easily adjusted by the operator to vary the thickness of the layer of material distributed thereby. With the stone spreaders at present in general commercial use, the width of the discharge opening is varied by means of plates that are adjustably secured to the front and rear walls of the hopper. Such a construction, however, usually requires frequent stopping of the vehicle and frequent trial adjustments to obtain the desired thickness of the layer of material. With my improved construction, it will be apparent that the desired adjustment may be easily accomplished by means of the hand lever 38 during the travel of the vehicle. Also, with my construction as the front and rear walls are simultaneously and equally moved during the operation of the hand operated lever 38 and, consequently, the lower portions of the walls are uniformly moved toward and from the axis of my improved agitating shaft 46, even distribution of the material is insured. It will also be noted that the power take-off device including the drum 54 provides a simple and efficient means for driving the agitating shaft of the spreader.

In place of the means comprising the hand lever 38 for operating the rock shaft 26, it may be desirable to employ the mechanism illustrated in Fig. 5. As shown this mechanism comprises an upstanding arm 62 which is substituted for one of the disks 30 secured on one end of the shaft 26, the links 32 associated with said end of the shaft being operatively connected with the lower portion of said arm. A block 64 is pivotally mounted on the upper end of the arm 62. A rod 66 has one end screw-threaded through an aperture in the block 64 and its other end extends through a swivel bearing block 68 on a bracket secured to the angle iron 16.

The screw rod 66 is held from longitudinal movement by a collar 70 secured thereon adjacent one end of the block 68 and a hand operable crank 72 secured on the outer end of the rod adjacent the outer end of the block 68. With this construction it will be apparent that upon turning the crank 72, the arm 62 may be moved in opposite directions to vary the width of the discharge opening in the spreader as desired, the screw and block connection permitting a fine adjustment to be made and serving to hold the side walls of the discharge opening in adjusted position.

The roads subject to treatment by an oil bath followed by a thin coat of coarse sand or fine crushed stone vary considerably in width, and in order to adapt the spreader for use on any width road and for any portion of the width of the road, I have provided means for varying the length of the discharge opening to vary the width of the layer of material discharged therefrom. As shown, this means comprises a valve flap 74 which extends substantially the length of the discharge opening, and is made in a plurality of sections that are independently hinged at one edge to the lower portion of the rear wall of the hopper, each flap section being provided with hinged members that are pivoted on a rod 76. One of the hinged members of each flap section is provided with a depending lug 78 to the lower end of which one end of a rod 80 is pivoted. The other end of each rod 80 extends through a guiding aperture in a lug 82 secured to the angle iron 36, and a spring 84 is coiled about the rod and interposed between the bracket lug 82 and a collar secured on the rod. With this construction when the valve flap sections are all swung into horizontal position so as to close the discharge opening throughout its length, each flap section is held in this closed position by means of its spring 84 acting through the rod 80 and the depending lug 78. The operator may, however, swing any one of the flap sections downwardly, and as the pivotal connection between the rod 80 and the lugs 78 passes its dead center the spring 84 will act to snap the flap section in its open position and will serve to maintain it in this position, as illustrated in Fig. 3 in which one of the flap sections is shown closed and the other open.

While it is preferable to have the front and rear walls of the spreader box or hopper made of flexible material and the adjustment effected by flexing the lower portions of these walls, it will be apparent that in some instances adjustment may be effected by hinging or pivotally mounting the front and rear walls or the lower portions thereof. It will also be apparent that my invention permits various other modifications to be made without departing from the spirit thereof or the scope of the appended claims.

What I claim is:

1. A spreader of the class described having, in combination, a hopper having end walls, and front and rear walls inclined downwardly and inwardly with their lower ends spaced apart to provide a discharge opening between them, said front and rear walls being made of flexible material to permit their lower portions to be flexed to move their lower edges toward and from each other to vary the width of said discharge opening, a shaft having its ends pivotally mounted in said end walls, means comprising links connecting each end of said shaft with the corresponding ends of said front and rear walls so as to thus flex said front and rear walls, and means under the control of the operator for turning said shaft.

2. A spreader of the class described having, in combination, a hopper having end walls, and front and rear walls inclined downwardly and inwardly with their lower edges spaced apart to provide a discharge opening between them, the lower portions of said walls being adapted to be moved to move their lower edges toward and from each other to vary the width of said discharge opening, a shaft having its ends pivotally mounted in said end walls, an arm secured to said shaft, a hand-operable crank, a screw and block connection between said crank and said shaft for turning said shaft in either direction upon operating said crank, and connections between each end of said shaft and the corresponding ends of said front and rear walls for thus moving said walls.

3. A spreader of the class described having, in combination, a hopper having a transversely extending discharge opening, a plurality of pivoted valve flaps adapted to be moved independently of each other to open and close different length portions of said opening, and means for independently retaining the valve flaps in both open and closed positions.

4. A spreader of the class described having, in combination, a hopper having a transversely extending discharge opening, a plurality of valve flaps adapted to be moved independently of each other to open and close different length portions of said opening, and a spring for holding each flap in both open and closed positions.

5. A spreader of the class described having, in combination, a hopper having end walls, and front and rear walls inclined downwardly and inwardly having their lower edges spaced apart to provide a discharge opening between them, said front and rear walls being made of flexible material to permit their lower portions to be flexed to move their lower edges toward and from each other to vary the width of said discharge opening, and manually operable means for simultaneously thus flexing said front and rear walls.

6. A spreader of the class described having, in combination, a hopper having front and rear walls having their lower ends spaced apart to provide a discharge opening between them, the lower portions of said walls being adapted to be moved to move their edges toward and from each other to vary the width of said discharge opening, means for thus moving said side walls, and means for varying the length of the discharge opening to vary the width of the layer of material discharged therefrom.

In testimony whereof I have signed my name to this specification this 26th day of February, 1928.

HARRY A. SCHAUPP.